United States Patent
Xenofos et al.

(10) Patent No.: US 6,860,099 B1
(45) Date of Patent: Mar. 1, 2005

(54) LIQUID PROPELLANT TRACING IMPINGEMENT INJECTOR

(75) Inventors: George D. Xenofos, Huntsville, AL (US); W. Neill Myers, Huntsville, AL (US); Huu Trinh, Madison, AL (US); R. Scott Michaels, Scottsboro, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 135 days.

(21) Appl. No.: 10/263,297

(22) Filed: Jan. 9, 2003

(51) Int. Cl.[7] .............................. F02K 9/00; F02K 9/42; F02K 9/72
(52) U.S. Cl. ........................................... 60/258; 60/257
(58) Field of Search .......................... 60/257, 258, 263, 60/740, 742

(56) References Cited

U.S. PATENT DOCUMENTS

| | | | | |
|---|---|---|---|---|
| 2,395,403 A | * | 2/1946 | Goddard | 60/201 |
| 2,706,887 A | * | 4/1955 | Grow | 60/258 |
| 3,098,353 A | * | 7/1963 | Abild | 60/39.27 |
| 3,490,238 A | * | 1/1970 | Capps et al. | 60/258 |
| 3,640,072 A | | 2/1972 | Kayser | |
| 3,695,041 A | * | 10/1972 | Eggers et al. | 60/264 |
| 3,724,217 A | * | 4/1973 | McDonald | 60/254 |
| 3,937,012 A | | 2/1976 | Zeh et al. | |
| 3,956,885 A | * | 5/1976 | Davis et al. | 60/39.462 |
| 4,069,664 A | * | 1/1978 | Ellion et al. | 60/258 |
| 4,586,226 A | | 5/1986 | Fakler et al. | |
| 5,177,955 A | | 1/1993 | Shekleton | |
| 5,265,415 A | | 11/1993 | Cox, Jr. | |
| 5,404,715 A | * | 4/1995 | Vuillamy et al. | 60/257 |
| 5,765,361 A | * | 6/1998 | Jones et al. | 60/204 |
| 6,082,098 A | * | 7/2000 | Park et al. | 60/258 |

* cited by examiner

Primary Examiner—Cheryl J. Tyler
Assistant Examiner—William H. Rodriguez
(74) Attorney, Agent, or Firm—James J. McGroary; Stephen J. Stark

(57) ABSTRACT

An injector for use with the rocket thruster has a plurality of fuel ports separated from a plurality of oxidizer ports. The oxidizer and fuel ports are paired together directing their respective fluids along a path with radial and tangential components so that the two fluids impinge at a predetermined spaced apart distance from the chamber wall of the combustion chamber at an impingement track. By providing the fuel at a steeper angle relative to the chamber walls than the oxidizer, the fuel can be utilized to provide a fuel rich zone near the chamber walls to assist in cooling the chamber walls during operation.

20 Claims, 2 Drawing Sheets

LIQUID PROPELLANT TRACING IMPINGEMENT INJECTOR

ORIGIN OF THE INVENTION

The invention described herein was made by employees of the United States Government and may be manufactured and used by or for the Government for Governmental purposes without the payment of any royalties thereon or therefore.

BACKGROUND OF THE INVENTION

1. Field of the Invention

This invention relates to a liquid propellant injector for use with a rocket thruster, more particularly to an improved injector defining combustion chamber therein.

2. Prior Art

Various injectors have been utilized with rocket propulsion systems in the past. U.S. Pat. No. 5,765,361 shows an injector which provides the oxidizer as well as the fuel axially in the direction of a nozzle. The igniter engine shown in FIG. 1A initially provides oxidizer to start the combustion process. Axially directed propellants typically take a relatively long combustion chamber to ensure that propellants mix and completely combust prior to exiting the nozzle.

U.S. Pat. No. 4,586,226 operates somewhat similarly to the '361 patent. Fuel is provided axially in the direction of the nozzle in the illustrated injector from a face plate at the chamber head end. In this design, the oxidizer is directed at an angle to intersect the flow path of the fuel and then proceed axially towards the nozzle (not shown).

In designs which axially direct propellants, the combustion chamber walls are typically cooled by film cooling or some other means, to prevent material degradation. These cooling concerns are believed to create a loss in performance. Additionally, traditional injectors often require a long time to fabricate and are usually costly to produce.

In order to overcome potential disadvantages of a long combustion chamber, numerous efforts have been undertaken to provide tangentially directed propellants. In U.S. Pat. No. 3,937,012, the oxidizer is initially supplied axially and inwardly to the fuel which then impinges upon a impeller to provide a tangential aspect to the flow of propellants. The oxidizer provides a cooling veil over the top surface of the impeller. (Column 4, lines 40–45.) The impeller design is believed to add to the complexity of the injector and possibly provide a point of failure and increased costs.

U.S. Pat. No. 3,640,072 shows a simpler combustion chamber for use with the rocket that directs propellants tangentially into the combustion chamber to the combustion sidewalls rather than actually at the head end of the chamber. The liquid propellants impinge along the chamber walls which is believed to impose the greatest thermal loads at the point of impingement along the walls. These thermal stresses are believed to be high enough to drastically reduce the life of the components.

While there have been a number of improvements in basic combustion chamber design, a need still exists to provide a low cost injector which is robust, requires little maintenance and may be reused. A need also exists to provide an engine combustion chamber having reduced complexity, cost of fabrication and overall weight.

SUMMARY OF THE INVENTION

Consequently, it is a primary object of the present invention to provide a low cost injector to be used in rocket engines or other combustion chambers.

Another object of the invention is to direct fuel and oxidizer within the combustion chamber so that the flow vortices keep low temperature fluids on the wall while the hot gas is at the center core.

Another object of the present invention is to provide an impingement trace internal to the combustion chamber walls with the fuel directed closer to the walls than the oxidizer.

Accordingly, a tracing impingement injector has a plurality of fuel ports separated from a plurality of oxidizer ports. The oxidizer and fuel ports direct fuel and oxidizer into the combustion chamber with a radial and tangential component such that the two fluids impinge a predetermined spaced apart distance from the chamber wall. It is further preferred that the fuel be introduced closer to the chamber walls so that the fuel provides a fuel rich zone near the wall to assist in cooling to the wall and to eliminate the wall oxidation during operation.

BRIEF DESCRIPTION OF THE DRAWINGS

The particular features and advantages of the invention as well as other objects will become apparent from the following description taken in connection with the accompanying drawings to which.

DETAILED DESCRIPTION OF THE PREFERRED EMBODIMENT

Figures 1, 2:
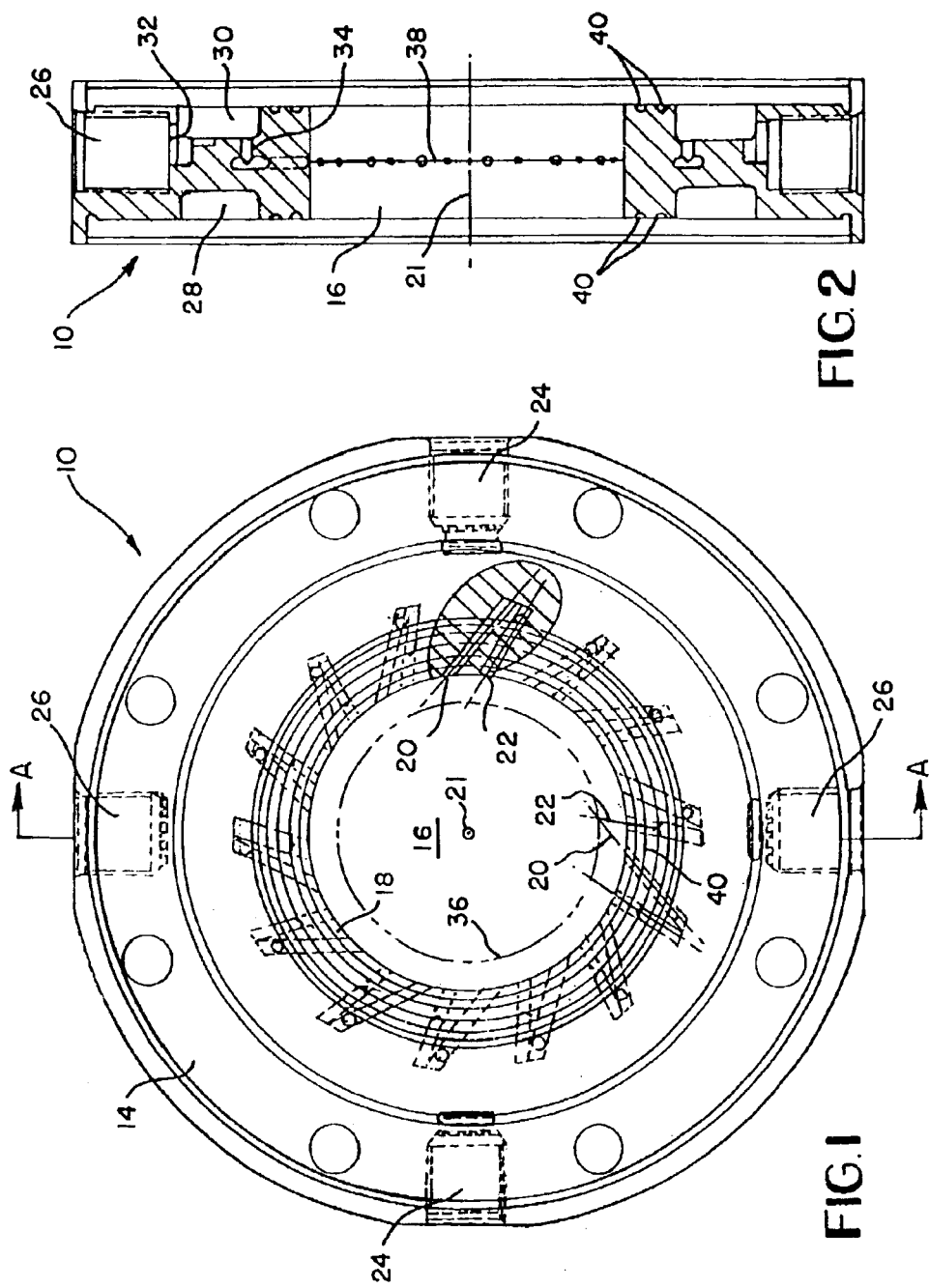
FIG. 1 is a top plan view of the tracing impingement injector.
FIG. 2 is a cross-sectional view taken along the line A—A of FIG. 1.
Figure 3:
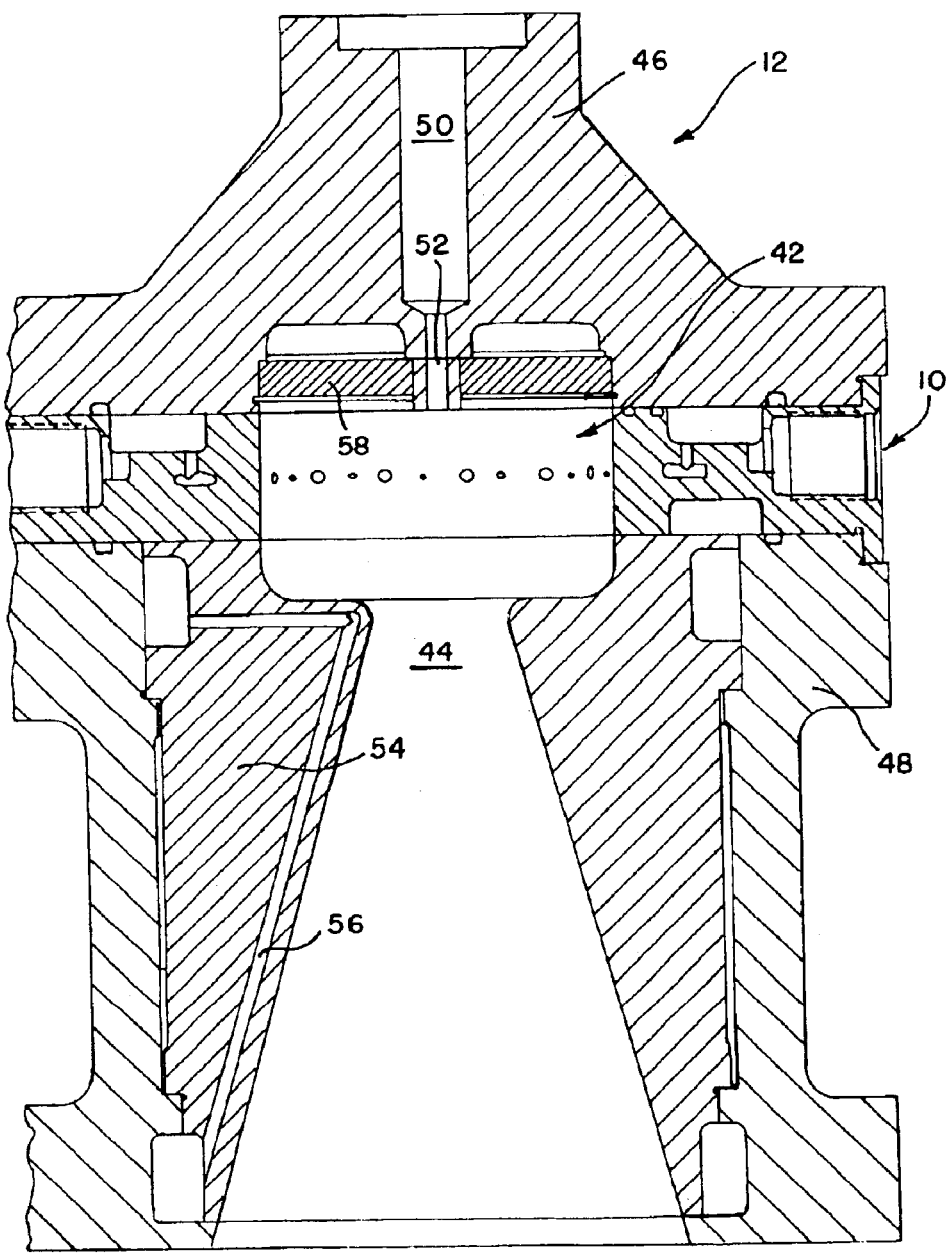
FIG. 3 shows the injector installed relative to a downstream nozzle in a rocket thruster.

Referring to FIGS. 1 and 2, a liquid propellant injector 10 is disclosed for use in a rocket thruster 12 as shown in FIG. 3. Referring back to FIGS. 1 and 2, the injector 10 is comprised of a housing 14 containing a combustion chamber 16 therein. The combustion chamber is defined by chamber walls 18 which surround the chamber 16. The chamber walls 18 have ports 20,22 which will be explained in more detail below which provide fuel and oxidizer to the combustion chamber 16. Fuel and oxidizer are often referred to as propellants herein. By fabricating the housing 14 with a three-dimensional computer aided design model, a laser engineered net shaping (LENS) machine was able to shape the combustion chamber 16 in the housing 14 and provide ports 20,22 as illustrated. Ports 20 are preferably utilized to provide oxidizer into the combustion chamber. Ports 22 are preferably utilized to provide fuel into the combustion chamber 16.

Inlet ports 24 receive oxidizers such as liquid oxygen from a supply. Inlet ports 26 receive fuel from a fuel supply. From the inlet ports 24,26, the respective propellant fluid, whether fuel or oxidizer, is directed through respective manifolds 28,30. Oxidizer manifold 28 is illustrated as a concentric ring along an upper portion of the housing 14 which is in communication with inlet port 24. Fuel manifold 30 is illustrated in a similar manner in communication with inlet port 26 in FIG. 2. As can be seen in FIG. 2, fuel enters inlet port 26 and passes into manifold 30 through duct 32. Once in the manifold 30, the fuel can be directed about the manifold 30 and dispensed through flues 34 into outlet ports 22. Once in the outlet ports 22, the fuel can then pass into the combustion chamber 16 as shown in FIG. 1.

As illustrated in FIG. 1, there are fourteen outlet ports 22 for fuel to be provided to the combustion chamber 16. There are also fourteen outlet ports 20 for oxidizers to be provided into the combustion chamber 16. The manifold/inlet/outlet port arrangement for providing the oxidizer in the preferred embodiment is very similar to the arrangement for the fuel. The oxidizer is provided from the inlet port 24 to the manifold 28 and then through the outlet ports 20 into the combustion chamber 16.

As shown in FIG. 1, the fuel outlet ports 22 introduce fuel closer to the chamber walls 18 than the oxidizer is introduced. This is the result of the geometry of the construction of the outlet ports 20,22. This feature is not only believed to assist in cooling the injector 10, but also to provide a fuel rich environment at the rear wall region to avoid the wall oxidation.

As illustrated in FIG. 1, the fuel and oxidizer injected from the outlet ports 20,22 impinges at a predetermined impingement track 36 which is spaced a predetermined distance from the chamber walls 18. Specifically in the preferred embodiment, the combustion chamber 16 has an internal diameter of 2.35 inches while the interior diameter of the impingement track has a diameter of 1.95 inches which is 0.20 inches spaced from the chamber walls 16. The spacing of the impingement track 36 from the chamber wall 18 has been found to assist in providing a fuel rich zone near the chamber wall 18 which assist in providing cooling to the chamber wall 18.

The ports 20,22 are preferably aligned in a port plane 38 illustrated in FIG. 2 which happens to coincide with the impingement track 36 which lies in an impingement plane. As can be seen in FIG. 2, the size of the oxidizer ports 20 are slightly greater than that of the fuel ports 22. This has been found to assist in an ability to provide fuel such as RP-1, at 1.15 lbm/sec while providing liquid oxidizer, at 2.96 lbm/sec. However, by varying the diameters and pressures at which the fuel and oxidizers supplied to the combustion chamber 16, various flow rates can be achieved. For instance, the above flow rates have been achieved when supplied both fuel and oxidizer at 1200 psia. Other flow rates may be desired for other propellants or other performance criteria.

The ports 20,22 may be angled at other orientations other than the orientations provided in FIG. 1. In FIG. 1, the oxidizer ports 20 are angled at about 40 degrees from a radius extending from a center axis 21 of the combustion chamber 16 extending through the any particular port 20. The fuel port 22 is angled at about 20 degrees relative to a radian extending through the center axis 21 of the combustion chamber 16 and the respective fuel port 22. By varying these angular relationships, the impingement track 36 may be moved closer or farther away from the chamber wall 18. Although the impingement track 36 is illustrated as being circular, it could take a number of forms depending on the shape of the chamber walls 18 and the orientation of the ports 20,22 as well as the relative size of the ports and pressures at which the propellants are introduced into the combustion chamber 16.

Seal grooves 40 provide a location for seals to extend circumferentially around the combustion chamber 16 to assist in preventing hot gasses in the combustion chamber 16 from mixing with either of the propellants in either of the manifolds 28,30. With some embodiments, final machining may be necessary to incorporate the fuel and oxidant inlet ports 24,26 and/or provide surface finishes for sealing with other components.

As the fuel injects into the combustion chamber 16, it is preferred that the fuel is introduced closer to the wall 18. As the propellants mix, a fuel rich zone near the wall 18 provides cooling. The propellants then migrate toward the head end 42 shown in FIG. 3. At the head end 42, the combustion products flow inward forming a circulating core or vortex and expand as they flow down the core toward the nozzle 44 past the throat.

FIG. 3 shows the chamber head housing 46 which is connected such as by eight bolts, to the injector 10 and the structural jacket 48. The chamber head housing 46 has an interior passage 50 which receives an igniter (not shown) therein. The igniter transmits a flame through an orifice 52 into the combustion chamber 16.

Below the injector 10 is the structural jacket 48 which surrounds the nozzle insert 54. A number of cooling ducts 56 extend around the circumference of the nozzle insert 54 and may be cooled by a number of fluids, including the fuel utilized as a propellant. The nozzle insert 54 has been constructed with oxygen free high conductivity copper, however, other appropriate materials may also be utilized. The structural jacket 48 has been constructed of 304L stainless steel while the other parts of the rocket 12 have been constructed of Inconel 718 or other appropriate material.

In order to assist cooling of the head end 42 of the injector and the lower portion of the chamber head housing 46, a Rigimesh™ plate 58 may be utilized which has a plurality of microscopic openings therethrough which has been found to assist in maintaining the chamber head housing 46 at acceptable temperatures during the use of the rocket 12.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A propellant injector comprising:
   a housing having a head end, a nozzle end, and a combustion chamber defined by a chamber wall in the housing;
   a fuel inlet port connected to a fuel manifold in the housing, the fuel manifold communicating fluid fuel from the fuel inlet port to a plurality of fuel outlet ports disposed about the combustion chamber;
   an oxidizer inlet port connected to an oxidizer manifold in the housing, the oxidizer manifold communicating fluid oxidizer from the oxidizer inlet port to a plurality of oxidizer outlet ports disposed about the combustion chamber;
   the oxidizer outlet ports and fuel outlet ports are located along a port plane, terminate at the chamber wall;
   and direct their respective fluid to contact at a point on an impingement track, said impingement track spaced from the chamber wall by a predetermined distance, and said outlet ports spaced from the head end of the housing.

2. The propellant injector of claim 1, the fuel and oxidizer outlet ports direct their respective fluid along an impingement plane.

3. The propellant injector of claim 1 wherein contact of fluids from the oxidizer and fuel outlet ports creates a vortex in the combustion chamber.

4. A propellant injector comprising:
   a housing having a head end, a nozzle end and a combustion chamber defined by a chamber wall in the housing;
   a fuel inlet port connected to a fuel manifold in the housing, the fuel manifold communicating fluid fuel from the fuel inlet port to a plurality of fuel outlet ports disposed about the combustion chamber;

an oxidizer inlet port connected to an oxidizer manifold in the housing, the oxidizer manifold communicating fluid oxidizer from the oxide inlet port to a plurality of oxidizer outlet ports disposed about the combustion chamber;

the fuel outlet ports and fuel outlet ports direct their respective fluid to contact at a point on an impingement track, said impingement track spaced from the chamber wall by a predetermined distance, and said outlet ports spaced from the head end of the housing and the fuel outlet ports terminate at the chamber wall.

5. A propellant injector comprising:

a housing having a head end, a nozzle end, and a combustion chamber defined by a chamber wall in the housing;

a fuel inlet port connected to a fuel manifold in the housing, the fuel manifold communicating fluid fuel form the fuel inlet port to a plurality of fuel outlet ports disposed about the combustion chamber;

an oxidizer inlet port connected to an oxidizer manifold in the housing the oxidizer manifold communicating fluid oxidizer from the oxidizer inlet port to a plurality of oxidizer outlet port disposed about the combustion chamber;

the fuel outlet ports and fuel outlet ports direct their respective fluid to contact at a point on an impingement track, said impingement track spaced from the chamber wall by a predetermined distance, and said outlet torts spaced from the head end of the housing, and the oxidizer outlet ports terminate at the chamber wall.

6. A propellant injector comprising:

a housing having a head end, a nozzle end, and a combustion chamber defined by a chamber wall in the housing;

a fuel inlet port connected to a fuel manifold in the housing, the fuel manifold communicating fluid fuel from the fuel inlet port to a plurality of fuel outlet ports disposed about the combustion chamber;

an oxidizer inlet port connected to an oxidizer manifold in the housing, the oxidizer manifold communicating fluid oxidizer from the oxidizer inlet port to a plurality of oxidizer outlet ports disposed about the combustion chamber;

the fuel outlet ports and fuel outlet tons direct their respective fluid to contact at a point on an impingement track, said impingement track spaced from et the chamber wall by a predetermined distance, and said outlet ports spaced from the head end of the housing and the fuel outlet ports are angled at a first angle relative to a first radian extending from a center axis of the combustion chamber to the fuel outlet port at the chamber wall, said center axis extending from the head end to the bottom end of the housing.

7. The propellant injector of claim 6 wherein the oxidizer outlet ports are angled at a second angle relative to a second radian extending from the center axis of the combustion chamber to the oxidizer outlet port at the chamber wall.

8. The propellant injector of claim 7 wherein the first angle is greater than the second angle.

9. A liquid propellant injector comprising:

a housing having a head end, a nozzle end, and a combustion chamber defined by a chamber wall extending intermediate the head end and nozzle end of the housing;

a fuel inlet port connected to a fuel manifold in the housing, the fuel manifold communicating fluid fuel from the fuel inlet port to a plurality of fuel outlet ports disposed about the combustion chamber;

an oxidizer inlet port connected to an oxidizer manifold in the housing, the oxidizer manifold communicating fluid oxidizer from the oxidizer inlet port to a plurality of oxidizer outlet ports disposed about the combustion chamber;

wherein each of the oxidizer outlet ports and the fuel outlet ports are paired to direct their respective fluid to contact at a point on an impingement track, said impinge ent track spaced from the chamber wall by a predetermined distance, said outlet ports spaced firm the head end of the housing and the oxidizer and fuel outlet ports are located along a port plane and terminate at the chamber wall.

10. The liquid propellant injector of claim 9 wherein the oxidizer and fuel outlet ports arm located along an impingement plane with the impingement track.

11. The liquid propellant injector of claim 9, wherein the fuel outlet port extends along a first axis, said first axis angled at a first angle relative to a first radian extending from the center axis to the fuel outlet port.

12. The liquid propellant injector of claim 11, wherein the oxidizer outlet port extends along a second axis, said second axis angled at a second angle relative to a second radian extending from the center axis to the oxidizer outlet port.

13. The liquid propellant injector of claim 12 wherein the first angle is greater than the second angle.

14. The liquid propellant injector of claim 9 wherein contact of fluids from the oxidizer and fuel outlet ports creates a vortex in the combustion chamber.

15. A fluid propellant injector comprising:

a housing having a combustion chamber defined by a cylindrical chamber wall;

a fuel manifold communicating fluid fuel to a plurality of fuel outlet ports disposed about the chamber wall directing fuel into the combustion chamber;

an oxidizer manifold communicating fluid oxidizer to a plurality of oxidizer outlet ports disposed about the chamber wall directing fuel into the combustion chamber; and wherein the plurality of oxidizer and fuel outlet ports are paired and direct their respective fluids to contact along an impingement track spaced from the cylindrical chamber wall, and at least one of the fuel outlet ports and the oxidizer outlet ports terminate at the chamber wall.

16. The liquid propellant injector of claim 15 wherein the oxidizer and fuel outlet ports are located along an impingement plane with the impingement track.

17. The liquid propellant injector of claim 15 wherein fuel outlet port extends along a first axis, said first axis angled at a first angle relative to a first radian extending from the center axis to the fuel outlet port.

18. The liquid propellant injector of claim 15 wherein the oxidizer outlet port extends along a second axis, said second axis angled at a second angle relative to a second radian extending from the center axis to the oxidizer outlet port.

19. The liquid propellant injector of claim 18 herein the first angle is greater than the second angle.

20. The fluid propellant injector of claim 15 wherein contact of fluids from the oxidizer and fuel outlet ports creates a vortex in the combustion chamber.

* * * * *